United States Patent
Suri et al.

(10) Patent No.: US 9,646,227 B2
(45) Date of Patent: May 9, 2017

(54) COMPUTERIZED MACHINE LEARNING OF INTERESTING VIDEO SECTIONS

(71) Applicant: MICROSOFT TECHNOLOGY LICENSING, LLC, Redmond, WA (US)

(72) Inventors: Nitin Suri, Redmond, WA (US); Xian-Sheng Hua, Sammamish, WA (US); Tzong-Jhy Wang, Seattle, WA (US); William D. Sproule, Woodinville, WA (US); Andrew S. Ivory, Woodinville, WA (US); Jin Li, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/445,463

(22) Filed: Jul. 29, 2014

(65) Prior Publication Data

US 2016/0034786 A1 Feb. 4, 2016

(51) Int. Cl.
  *G06K 9/62* (2006.01)
  *G06T 7/20* (2017.01)
  *G06K 9/00* (2006.01)

(52) U.S. Cl.
  CPC ....... *G06K 9/6256* (2013.01); *G06K 9/00744* (2013.01); *G06T 7/20* (2013.01); *G06T 2207/10016* (2013.01)

(58) Field of Classification Search
  None
  See application file for complete search history.

(56) References Cited

U.S. PATENT DOCUMENTS 5,854,902 A   12/1998   Wilson et al.
5,917,958 A   6/1999   Nunally et al.
(Continued)

FOREIGN PATENT DOCUMENTS

WO   WO0016243      3/2000
WO   WO2010006334   1/2010
(Continued)

OTHER PUBLICATIONS

"Face SDK Beta", Microsoft Research, retrieved on Jul. 28, 2014 at <<ms-its:C:\Program Files (x86)\Microsoft Research\Face SDK Beta for Windows Phone\doc\Fac7e/2 S8D/2K01 M4 anual>>, 22 Pages.
(Continued)

*Primary Examiner* — Iman K Kholdebarin
(74) *Attorney, Agent, or Firm* — Jacob P. Rohwer; Newport IP, LLC

(57) ABSTRACT

This disclosure describes techniques for training models from video data and applying the learned models to identify desirable video data. Video data may be labeled to indicate a semantic category and/or a score indicative of desirability. The video data may be processed to extract low and high level features. A classifier and a scoring model may be trained based on the extracted features. The classifier may estimate a probability that the video data belongs to at least one of the categories in a set of semantic categories. The scoring model may determine a desirability score for the video data. New video data may be processed to extract low and high level features, and feature values may be determined based on the extracted features. The learned classifier and scoring model may be applied to the feature values to determine a desirability score associated with the new video data.

17 Claims, 8 Drawing Sheets

(56) References Cited

U.S. PATENT DOCUMENTS

| | | | |
|---|---|---|---|
| 6,771,268 B1* | 8/2004 | Crinon | G06F 17/30799 345/475 |
| 7,383,504 B1* | 6/2008 | Divakaran | G06K 9/00711 345/440 |
| 7,386,170 B2 | 6/2008 | Ronk et al. | |
| 7,616,816 B2 | 11/2009 | Cheng | |
| 7,707,008 B1* | 4/2010 | Champlin | G06Q 10/087 700/115 |
| 7,755,619 B2 | 7/2010 | Wang et al. | |
| 7,881,505 B2 | 2/2011 | Schneiderman et al. | |
| 7,916,894 B1 | 3/2011 | Dhillon et al. | |
| 7,933,338 B1* | 4/2011 | Choudhry | G06F 17/30781 375/240.26 |
| 8,134,596 B2* | 3/2012 | Lei | G06K 9/00369 348/169 |
| 8,170,280 B2 | 5/2012 | Zhao et al. | |
| 8,185,543 B1* | 5/2012 | Choudhry | G06F 17/30781 382/305 |
| 8,189,880 B2 | 5/2012 | Wen et al. | |
| 8,200,063 B2* | 6/2012 | Chen | G06F 17/30787 386/239 |
| 8,311,344 B2* | 11/2012 | Dunlop | G06K 9/00664 382/224 |
| 8,379,154 B2* | 2/2013 | Zhang | G11B 27/28 348/701 |
| 8,452,778 B1* | 5/2013 | Song | G06K 9/00711 704/233 |
| 8,489,589 B2* | 7/2013 | Mei | G06F 17/3053 707/728 |
| 8,494,231 B2 | 7/2013 | Folta et al. | |
| 8,560,406 B1* | 10/2013 | Antony | G06Q 10/08 705/28 |
| 8,565,536 B2* | 10/2013 | Liu | G06K 9/00577 382/224 |
| 8,595,781 B2 | 11/2013 | Neumeier et al. | |
| 8,605,956 B2 | 12/2013 | Ross et al. | |
| 8,619,150 B2 | 12/2013 | Deever | |
| 8,661,029 B1 | 2/2014 | Kim et al. | |
| 8,687,941 B2* | 4/2014 | Dirik | H04N 5/147 386/240 |
| 8,705,810 B2 | 4/2014 | Wang et al. | |
| 8,730,397 B1* | 5/2014 | Zhang | G06F 17/30849 348/559 |
| 8,824,747 B2 | 9/2014 | Free | |
| 9,025,866 B2* | 5/2015 | Liu | G06K 9/00577 382/159 |
| 9,141,859 B2* | 9/2015 | Vunic | G06K 9/00711 |
| 9,161,007 B2 | 10/2015 | Suri et al. | |
| 9,245,190 B2 | 1/2016 | Rosenkrantz | |
| 2003/0091235 A1* | 5/2003 | Xiong | G06F 17/30802 382/199 |
| 2004/0010430 A1* | 1/2004 | Cinquini | G07B 17/00193 705/60 |
| 2004/0201609 A1* | 10/2004 | Obrador | G06F 17/30017 715/723 |
| 2004/0202377 A1 | 10/2004 | Murakami | |
| 2004/0228503 A1 | 11/2004 | Cutler | |
| 2005/0008198 A1* | 1/2005 | Guo | G06K 9/00228 382/115 |
| 2005/0084152 A1 | 4/2005 | McPeake et al. | |
| 2005/0198067 A1* | 9/2005 | Liu | G06K 9/00711 |
| 2005/0289482 A1 | 12/2005 | Anthony et al. | |
| 2007/0019863 A1 | 1/2007 | Ito | |
| 2007/0101269 A1* | 5/2007 | Hua | G06F 17/30811 715/723 |
| 2007/0183497 A1* | 8/2007 | Luo | G06F 17/30811 375/240.12 |
| 2007/0263128 A1* | 11/2007 | Zhang | G11B 27/28 348/700 |
| 2007/0289432 A1* | 12/2007 | Basu | G10H 7/008 84/609 |
| 2008/0002771 A1* | 1/2008 | Chen | H04N 19/139 375/240.16 |
| 2008/0019661 A1 | 1/2008 | Obrador et al. | |
| 2008/0184120 A1* | 7/2008 | OBrien-Strain | G06F 17/30843 715/723 |
| 2008/0195981 A1* | 8/2008 | Pulier | G11B 27/034 715/719 |
| 2009/0016576 A1 | 1/2009 | Goh et al. | |
| 2009/0079871 A1* | 3/2009 | Hua | G11B 27/036 348/584 |
| 2009/0080853 A1 | 3/2009 | Chen et al. | |
| 2009/0169065 A1 | 7/2009 | Wang et al. | |
| 2009/0169168 A1 | 7/2009 | Ishikawa | |
| 2009/0208106 A1* | 8/2009 | Dunlop | G06K 9/00664 382/173 |
| 2009/0292685 A1* | 11/2009 | Liu | G06F 17/30817 |
| 2010/0014717 A1 | 1/2010 | Rosenkrantz | |
| 2010/0045799 A1* | 2/2010 | Lei | G06K 9/00369 348/169 |
| 2010/0054705 A1 | 3/2010 | Okamoto et al. | |
| 2010/0142803 A1* | 6/2010 | Wang | G06K 9/6297 382/160 |
| 2010/0306193 A1 | 12/2010 | Pereira et al. | |
| 2011/0211736 A1 | 9/2011 | Krupka et al. | |
| 2011/0243450 A1* | 10/2011 | Liu | G06K 9/00577 382/190 |
| 2011/0249953 A1 | 10/2011 | Suri et al. | |
| 2011/0263946 A1 | 10/2011 | el Kaliouby et al. | |
| 2011/0292232 A1 | 12/2011 | Zhang et al. | |
| 2011/0292288 A1 | 12/2011 | Deever | |
| 2012/0095817 A1* | 4/2012 | Kamil | G06Q 30/0241 705/14.4 |
| 2012/0230545 A1 | 9/2012 | Zhang et al. | |
| 2012/0233159 A1* | 9/2012 | Datta | G06F 17/30256 707/728 |
| 2012/0294540 A1 | 11/2012 | Sun et al. | |
| 2012/0301014 A1* | 11/2012 | Xiao | G06K 9/4676 382/159 |
| 2013/0051756 A1* | 2/2013 | Chao | H04N 21/44008 386/241 |
| 2013/0114942 A1 | 5/2013 | Yu et al. | |
| 2013/0142418 A1* | 6/2013 | van Zwol | G06K 9/00751 382/159 |
| 2013/0148003 A1 | 6/2013 | Penev et al. | |
| 2013/0262462 A1 | 10/2013 | Srikrishna et al. | |
| 2013/0322765 A1 | 12/2013 | Neumann et al. | |
| 2014/0135966 A1* | 5/2014 | Pettersson | G06Q 10/043 700/100 |
| 2014/0201126 A1 | 7/2014 | Zadeh et al. | |
| 2014/0270350 A1* | 9/2014 | Rodriguez-Serrano | G06K 9/6217 382/103 |
| 2014/0369422 A1 | 12/2014 | Wang et al. | |
| 2015/0082349 A1* | 3/2015 | Ishtiaq | H04N 21/23418 725/40 |
| 2015/0110349 A1 | 4/2015 | Feng et al. | |
| 2015/0142744 A1 | 5/2015 | Weinstein et al. | |
| 2015/0296228 A1* | 10/2015 | Chen | G06F 17/30029 725/34 |
| 2016/0034748 A1* | 2/2016 | Wang | G06K 9/00281 382/201 |
| 2016/0034786 A1* | 2/2016 | Suri | G06K 9/6256 382/159 |
| 2016/0117749 A1* | 4/2016 | Desmarais | G06T 7/602 382/111 |

FOREIGN PATENT DOCUMENTS

| | | |
|---|---|---|
| WO | WO2012138828 | 10/2012 |
| WO | WO2013063736 | 5/2013 |

OTHER PUBLICATIONS

"Feature detection (computer vision)", Retrieved on: Jun. 10, 2014, Available at: http://en.wikipedia.org/wiki/Feature_detection_(computer_vision), 3 pages.

Jiang, et al., "Automatic Consumer Video Summarization by Audio and Visual Analysis", In IEEE International Conference on Multimedia and Expo, Jul. 11, 2011, 6 pages.

(56) References Cited

OTHER PUBLICATIONS

Luthra, et al., "A Machine Learning based Approach to Video Summarization", Retrieved on: Apr. 30, 2014, Available at: http://www.cse.iitb.ac.in/~sharat/icvgip.org/ncvpripg2008/papers/24.pdf, 5 pages.
Ma, et al., "A User Attention Model for Video Summarization", In Proceedings of 10th ACM International Conference on Multimedia, Dec. 2002, 10 pages.
"Microsoft Research Face SDK Beta", retrieved on Jul. 28, 2014 at <<http://research.microsoft.com/en-us/projects/facesdk/default.aspx>>, 2 pages.
Sivic, et al., "Person spotting: video shot retrieval for face sets", In Proceedings of the 4th international conference on Image and Video Retrieval, Jul. 20, 2005, 10 pages.
Xu, et al., "Automatic Generated Recommendation for Movie Trailers", In IEEE International Symposium on Broadband Multimedia Systems and Broadcasting, Jun. 5, 2013, 6 pages.
Zhu, et al., "A Rank-Order Distance based Clustering Algorithm for Face Tagging", MSR's face SDK documentation: \\tkfiltoolbox\tools\facesdk\March 2014 Release\doc\html\master_facesdk.html, 8 pages.
Office action for U.S. Appl. No. 14/445,518, mailed on Oct. 27, 2015, Wang et al., "Computerized Prominent Character Recognition in Videos", 22 pages.
Office action for U.S. Appl. No. 14/445,518, mailed on May 13, 2016, Wang et al., "Computerized Prominent Character Recognition in Videos", 15 pages.
PCT Seach Report and Written Opinion mailed Mar. 2, 2016 for PCT application No. PCT/US2015/041869, 17 pages.

* cited by examiner

COMPUTERIZED MACHINE LEARNING OF INTERESTING VIDEO SECTIONS

BACKGROUND

Consuming video content involves a significant time commitment. Unlike photos, which may be consumed almost instantly, a user must view an entire video before identifying sections of desirable content. For example, if a user takes one hundred videos while he or she is on vacation and subsequently wants to show friends and family some of the best videos from his or her vacation, he or she will need to watch the entire video collection to identify which videos he or she wants to share.

Current techniques for optimizing video consumption extract some features from a video (e.g., histograms, faces, audio power, speech, etc.) and apply rules to the extracted features. Generally, the rules are applied locally and/or temporally. The rules, however, are not generalized for application to diverse types of video content and accordingly, many rules become contradictory when optimized for a specific type of content.

In addition to contradictory rules, another problem with current techniques is that individuals have varying perceptions of what makes a portion of video content desirable and current techniques do not account for the subjectivity involved in identifying desirable sections of video data.

Furthermore, current techniques are directed to video content having multiple scenes within a single video file. Windows Movie Maker, for example, is geared towards longer duration video content having multiple scenes within a single video file. Windows Movie Maker detects low level features from video content and uses these features to create a summary of the video content by selecting important segments from all parts of a video file. With modern technologies, users create video content different from in the past. For example, current video content may be recorded in a digital format such that each video file is typically a short scene. Accordingly, current techniques are insufficient for identifying desirable portions of video content in video data.

SUMMARY

This disclosure describes techniques for training models from video data based on low level and high level features and applying the learned models to new video data for identifying desirable video data in the new video data.

In at least one example, video data may be received and features may be extracted from the video data. The features may include low level features and high level features. A first set of feature values associated with the features may be determined for training a classifier and a scoring model. The first set of feature values may include one or more low level feature values associated with the low level features, one or more high level feature values associated with the high level features, and derivative feature values derived from at least some of the one or more low level feature values and/or one or more high level feature values.

After training the classifier, the classifier may be applied to the video data to determine a second set of feature values. The second set of feature values may represent probabilities that the video data belongs to at least one semantic category of a predefined set of semantic categories. The second set of features may represent high level features that may or may not be learned from the first set of features. Then, the scoring model may be trained based on the first set of feature values and the second set of feature values. The scoring model may be used to determine a desirability score associated with the video data.

The classifier and scoring model may be leveraged to determine desirability scores associated with the video data. In at least one example, a user may input video data into the systems described herein. The video data may include video frames, video segments, video files, and/or video collections. A plurality of features may be extracted from the video data to determine a first set of feature values associated with video data. The classifier may be applied to the first set of feature values to determine a second set of feature values associated with the video data. The second set of feature values may represent probabilities that video data belongs to at least one semantic category of a predefined set of semantic categories. Then, the scoring model may be applied to the first set of feature values and the second set of feature values to determine a desirability score associated with the video data.

Leveraging the techniques described herein enables a user to quickly identify and/or rank desirable video collections, video files, video segments, and/or video frames to playback/view, edit, and/or share without a significant investment of time. Accordingly, the techniques described herein may be useful for improving viewing, editing, and sharing video data.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
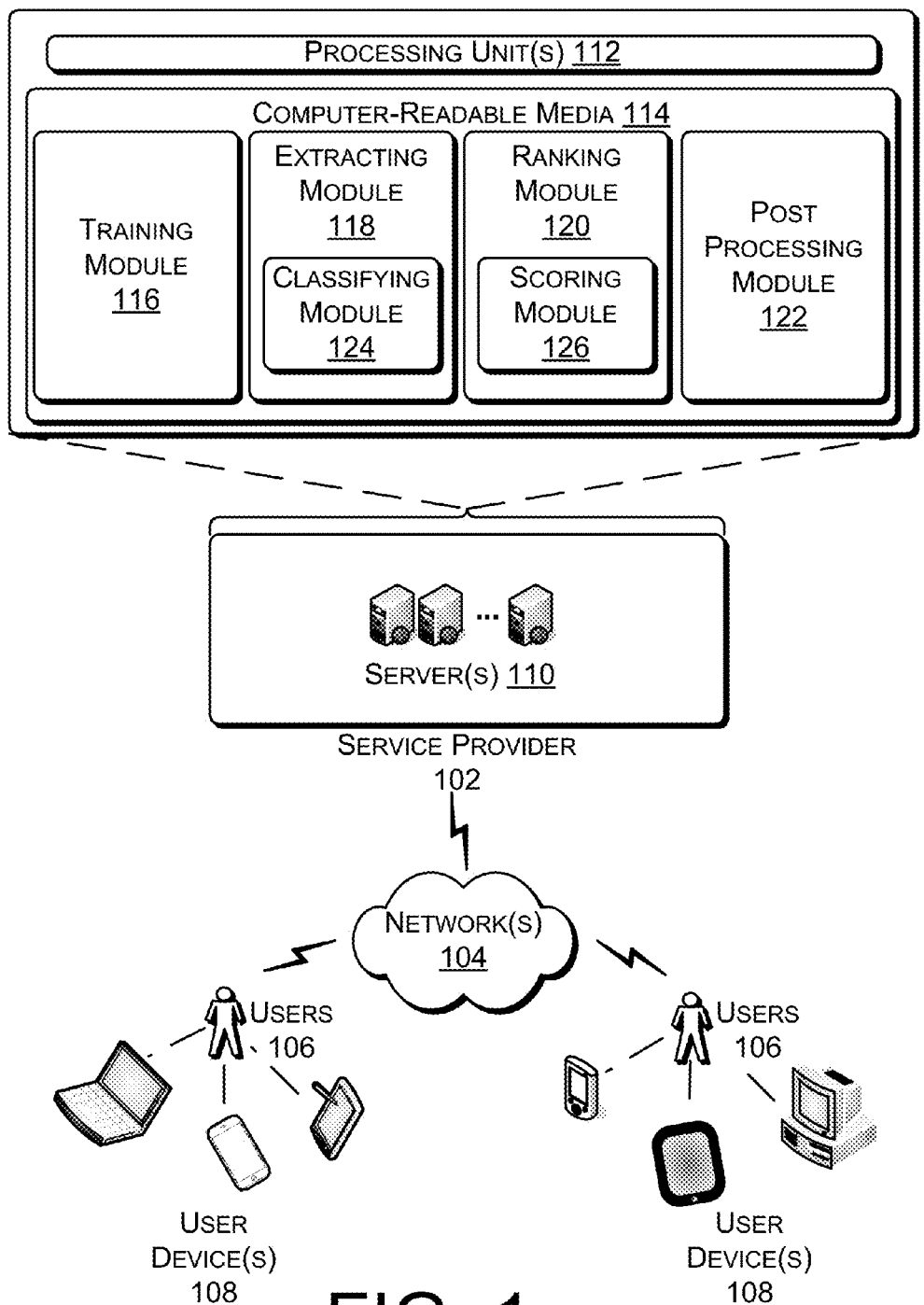
FIG. 1 is a schematic diagram showing an example environment for training models from video data based on low level and high level features and applying the learned models to new video data for identifying desirable video data in the new video data.

This disclosure describes techniques for training models from video data based on low level and high level features and applying resulting learned models to new video data for identifying desirable video data in the new video data. In at least one example, a collection of video data may be labeled to indicate a category (e.g., indoor, outdoor, mountain, lake, city, country, home, party, sporting event, zoo, concert, etc.) and/or a score indicative of desirability. The collection of video data may be processed to extract low level and high level features. In at least one example, feature extraction may describe determining a value or set of values for video data based on the feature extraction. Using the extracted features, a classifier (or multiple sub-classifiers) and a scoring model may be trained. The classifier may be used to estimate a probability that a video frame, video segment, video file, and/or video collection belongs to at least one of the categories in the predefined set of semantic categories (e.g., indoor, outdoor, mountain, lake, city, country, home, party, sporting event, zoo, concert, etc.). The scoring model may be used to determine a desirability score for video frames, video segments, video files, and/or video collections. In at least one example, the classifier may be applied to the video data to generate a set of feature values to be included with the feature values generated from the low level and high level feature extraction for training the scoring model.

The techniques described herein further describe applying the classifier and scoring model to new video data for identifying desirable video data in the new video data. A user may select video data stored on his or her user device for input into the systems described herein, or may take videos via his or her user device for input into the systems described herein. The input video data may be processed to extract features and feature values are determined based on the extracted features. The feature extraction process may include extracting low level and high level features and determining feature values associated with the low level and high level features. The classifier and the scoring model may be applied to the feature values to determine a desirability score associated with video frames, video segments, video files, and/or video collections. In at least one example, the classifier may be applied to the feature values to generate a set of feature values representing probabilities that a video frame, video segment, video file, and/or video collection belongs to at least one of the categories in the predefined set of semantic categories (e.g., indoor, outdoor, mountain, lake, city, country, home, party, sporting event, zoo, concert, etc.). The resulting set of feature values may be processed by the scoring model in addition to the feature values associated with the low level and high level features. In at least one example, the desirability score may be reflective of the semantic category associated with the video data.

Leveraging the techniques described herein enables a user to quickly identify and/or rank desirable video collections, video files, video segments, and/or video frames to playback, share, and/or edit without a significant investment of time. Accordingly, the techniques described herein may be useful for improving viewing, sharing, and editing video data.

For the purposes of this discussion, video data may include video frames, video segments, video files, and/or video collections. The video data may also include audio data. Video frames represent individual still images that, when combined, complete a moving picture. Video segments represent a set of consecutive video frames. In at least one example, a video segment may be defined as a fixed number of video frames (e.g., 20 video frames, 40 video frames, etc.). In other examples, a video segment may be defined by a time period (e.g., two seconds, five seconds, etc.). A video segment may represent a continuous shot and/or a scene within a longer video file. A video file contains a set of video segments stored in the video file. In at least one example, a video file represents an individual scene. In some examples, a video file represents a continuous shot. In at least one example, a digital recording device (e.g., phones, cameras, etc.) may be used to capture the individual scene and/or continuous shot that represents a video file. Video collections are compilations of video files collected over a period of time. The video files in the video collections may represent different categories, events, locations, characters, scenes, etc. Video files in the video collections may be related by category, event, location (e.g., geo-stamp), character, scene, and/or time frame (e.g., time-stamp).

As discussed above, current techniques fail to consider varying perceptions of desirable video data and the subjectivity involved in identifying desirable sections of video data. The techniques described herein, however, strive to train models for modeling human perception of desirable video data. Desirability, in this context, considers at least some technical qualities and subjective importance. In at least one example, technical quality describes a quality of technical composition of the video data. Technical qualities include, but are not limited to, exposure quality, color distribution, stability, brightness, etc. Subjective importance may consider qualities such as a presence of important characters, clear audio, clear object and/or camera motion, etc. The combination of strong technical quality (e.g., full exposure, even color distribution, minimal camera motion, bright colors, focused faces, etc.) and subjective importance above a predetermined threshold (e.g., main character, clear audio, minimal camera motion, and/or object motion, etc.) may result in desirable video data. In contrast, poor technical quality (e.g., poor exposure, uneven color distribution, significant camera motion, dark picture, etc.) and/or subjective importance below a predetermined threshold (e.g., unimportant character, muffled audio, significant camera motion and/or object motion, etc.) may result in undesirable video data. In various examples, video data may have a neutral level of desirability (e.g., the video data is not desirable or undesirable).

The techniques described herein describe training models from video data based on low level and high level features and applying the learned models to new video data for identifying desirable video data in the new video data. Identifying desirable video data may be useful for optimizing user consumption of video data. For example, a user may compile a large collection of videos over time. At some subsequent time, a user may desire to playback, share, and/or edit individual video collections, video files, video segments, and/or video frames. By leveraging the techniques described herein, a user may be able to quickly identify desirable video files, video segments, and/or video frames to playback, share, and/or edit without a significant investment of time.

In at least one example, the techniques described herein may be useful for identifying a set of video data and ranking individual video frames, video segments, video files, or video collections in the video data based on which individual video frames, video segments, video files, or video collections are the most desirable according to desirability scores. In other examples, the identified set of video data may be filtered based on levels of desirability per the desirability scores associated with individual video frames, video segments, video files, and/or video collections. For instance, video frames, video segments, video files, and/or video collections may be ranked against other video frames, video segments, video files, and/or video collections based on the desirability scores.

In some examples, the techniques described herein may be useful in marking individual video segments and/or video frames in video files that are desirable, based on desirability scores. Accordingly, a user may quickly identify video segments and/or video frames having a high level of desirability and may quickly access and playback, share, and/or edit such video data. In another example, the techniques described herein may be useful for identifying a set of thumbnails that are representative of a video segment, video file, or video collection having a high level of desirability, or a desirability score above a predetermined threshold. The set of thumbnails may represent a set of video frames having a desirability score above a predetermined threshold, or a set of video frames representing video segments, video files, and/or video collections having desirability scores above predetermined thresholds. When a user desires to playback video data, he or she may click on a representative thumbnail, start playback from the video frame represented as a thumbnail, and continue playback until an end of an interesting video segment, video file, or video collection.

In other examples, the techniques described herein may be useful for video editing. For example, in at least one example, a user may be presented with a user interface identifying desirable video data for manipulating the video data. In other examples, desirable video data may be segmented and combined to automatically create video files summarizing or highlighting content in a video collection and/or video file. A summarizing video file may be a video file that includes video segments and/or video frames from every portion of a video file and/or video collection. A highlighting video file may be a video file that includes important video segments and/or video frames from a video file and/or video collection. In at least one example, transitions may be added between the segmented video data to provide for seamless viewing.

Examples described herein provide techniques for training models from video data based on low level and high level features and applying the learned models to new video data for identifying desirable video data in the new video data. In various instances, a processing unit configured via programming from modules or APIs to perform techniques as described herein can include one or more of a central processing unit (CPU), a graphics processing unit (GPU), a field-programmable gate array (FPGA), another class of digital signal processor (DSP), or other hardware logic components that may, in some instances, be driven by the CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Illustrative Environment

FIG. 1 is a diagram showing an example environment 100 for training models from video data based on low level and high level features and applying the learned models to new video data for identifying desirable video data. More particularly, the example environment 100 may include a service provider 102, one or more network(s) 104, one or more users 106, and one or more user devices 108 associated with the one or more users 106. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As shown, the service provider 102 may include one or more server(s) 110, which may include one or more processing unit(s) 112 and computer-readable media 114. In various examples, the service provider 102 may train models from video data based on low level and high level features. The service provider 102 may receive video data. The service provider 102 may extract high and low level features from the video data and may train models based on the extracted features. In at least one example, the service provider 102 may leverage the learned models for identifying desirable video data in new video data. In other examples, the learned models may be stored on a user device 108 and may be leveraged for identifying desirable video data in new video data on the user device 108.

In some examples, the network(s) 104 may be any type of network known in the art, such as the Internet. Moreover, the user devices 108 may communicatively couple to the network(s) 104 in any manner, such as by a global or local wired or wireless connection (e.g., local area network (LAN), intranet, etc.). The network(s) 104 may facilitate communication between the server(s) 110 and the user devices 108 associated with the users 106.

In some examples, the users 106 may operate corresponding user devices 108 to perform various functions associated with the user devices 108, which may include one or more processing unit(s), computer-readable storage media, and a display. Furthermore, the users 106 may utilize the user devices 108 to communicate with other users 106 via the one or more network(s) 104.

User device(s) 108 can represent a diverse variety of device types and are not limited to any particular type of device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

The service provider 102 may be any entity, server(s), platform, etc., that may train models from video data based on low level and high level features and, in some examples, apply the learned models to new video data for identifying desirable video data in the new video data. Moreover, and as shown, the service provider 102 may include one or more server(s) 110, which may include one or more processing unit(s) 112 and computer-readable media 114 such as memory. The one or more server(s) 110 may include devices.

Examples support scenarios where device(s) that may be included in the one or more server(s) 110 can include one or more computing devices that operate in a cluster or other clustered configuration to share resources, balance load, increase performance, provide fail-over support or redundancy, or for other purposes. In at least one example, the techniques described herein may be performed remotely (e.g., by a server, cloud, etc.). In some examples, the techniques described herein may be performed locally on a user device. In other examples, the techniques described herein may be performed in part remotely and in part locally. For example, training the classifier and the scoring models may be performed on one or more server(s) 110 and applying the trained models (e.g., processing the video content) may be performed by a user on a user device 108. In additional examples, the techniques described herein may be performed on a user device. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) that may be included in the one or more server(s) 110 can include any type of computing device having one or more processing unit(s) 112 operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, a training module 116, an extracting module 118, a ranking module 120, and post-processing module 122, and other modules, programs, or applications that are loadable and executable by processing units(s) 112. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Device(s) that may be included in the one or more server(s) 110 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) 112 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) 112 may execute one or more modules and/or processes to cause the server(s) 110 to perform a variety of functions, as set forth above and explained in further detail in the following disclosure. Additionally, each of the processing unit(s) 112 may possess its own local memory, which also may store program modules, program data, and/or one or more operating systems.

In at least one configuration, the computer-readable media 114 of the server(s) 110 may include components that facilitate interaction between the service provider 102 and the users 106. For example, the computer-readable media 114 may include the training module 116, the extracting module 118, the ranking module 120, and the post-processing module 122. In at least some examples, the modules (116, 118, 120, and 122) may include additional modules such as a classifying module 124, a scoring module 126, and/or other modules. The modules (116, 118, 120, and 122) can be implemented as computer-readable instructions, various data structures, and so forth via at least one processing unit(s) 112 to configure a device to execute instructions and to perform operations implementing training models from video data based on low level and high level features and applying the learned models to new video data for identifying desirable video data in the new video data. Functionality to perform these operations may be included in multiple devices or a single device.

Depending on the exact configuration and type of the server(s) 110, the computer-readable media 114 may include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

Figure 2:
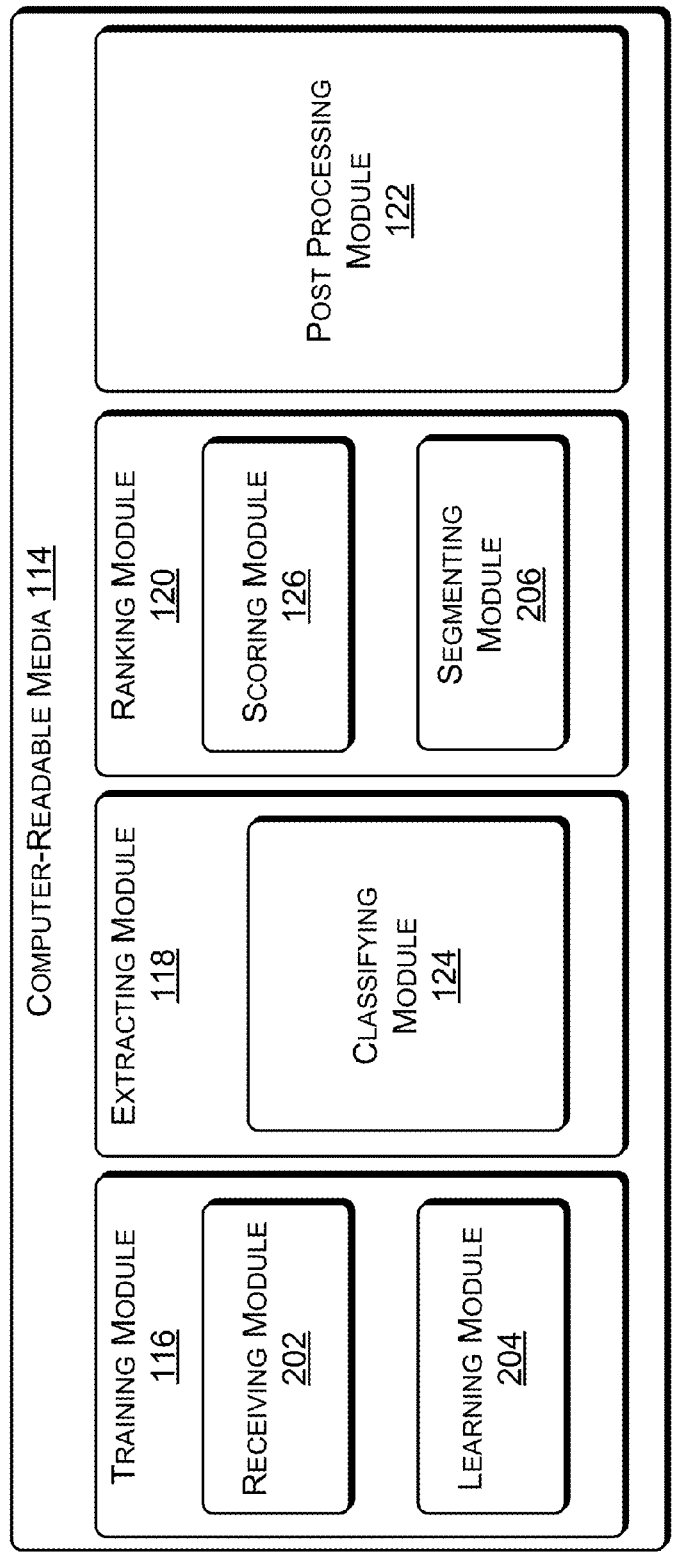
FIG. 2 is a block diagram showing additional components of the example environment for training models from video data based on low level and high level features and applying the learned models to new video data for identifying desirable video data in the new video data.

FIG. 2 is a diagram showing additional components of the example environment 200 for training models from video data based on low level and high level features and applying the learned models to new video data for identifying desirable video data in the new video data. As shown in FIGS. 1 and 2, the environment 200 may include the training module 116, the extracting module 118, the ranking module 120, and the post-processing module 122.

The training module 116 may be configured to train models based on extracted features. The training module 116 may include a receiving module 202 and a learning module 204. The receiving module 202 may be configured to receive video data. In at least one example, the video data may include a video collection, video files, video segments, and/or video frames. The video data may be pre-labeled with semantic categories describing the video data and/or scores indicative of desirability. In some examples, individual video files, video segments, video frames, and/or video collections may be individually labeled with the semantic categories and/or scores indicative of desirability after the receiving module 202 receives the video data. For example, the video data may be labeled as shown in the example pseudocode below.

```
<VideoAnalysisUserLabeledData version="2.0">
    <VideoFile filename="Chinooks are in the air.mp4">
        <ImportantSections />
        <UnimportantSections>
            <Section startTime="0" endTime="35" score="0">
                <Tags>
                    <Tag value="" />
                </Tags>
            </Section>
        </UnimportantSections>
        <TechnicallyRealyBadSections>
            <TechnicallyReallyBadSection startTime="2" endTime="4">
                <Tags>
                    <Tag value="Camera rotating 90 Degree; Dark;" />
                </Tags>
            </TechnicallyReallyBadSection>
            <TechnicallyReallyBadSection startTime="4" endTime="7">
                <Tags>
                    <Tag value="Shaky; Fast Panning; Dark" />
                </Tags>
            </TechnicallyReallyBadSection>
            <TechnicallyReallyBadSection startTime="7" endTime="35">
                <Tags>
                    <Tag value="Shaky; Dark" />
                </Tags>
            </TechnicallyReallyBadSection>
        </TechnicallyRealyBadSections>
        <TechnicallyBadSections />
        <TechnicallyNeutralSections />
        <TechnicallyGoodSections />
        <TechnicallyReallyGoodSections />
        <TechnicalQuality>
            <Exposure Indoor="true" Outdoor="false" TransitionInOut="false" LowLight="true" />
            <Shakiness NoShakiness="false" ShakinessDueToCameraMotion="true"
```

-continued

```
            ShakinessWithoutToCameraMotion="false" />
            <WhiteBalance WarmTint="false" ColdTint="false" />
            <VideoNoise NoNoise="false" MediumNoise="true" HighNoise="false" />
            <AudioQuality NoBkgrdNoise="true" HighBkgrdNoise="false" LowSpeechValue="false" />
        </TechnicalQuality>
        <Tags>
            <Tag value="resturant" />
            <Tag value="Orientation wrong" />
        </Tags>
    </VideoFile>
</VideoAnalysisUserLabeledData>
```

The semantic categories may belong to a set of predefined semantic categories that describes the subject matter of the video data. For example, semantic categories may include indoor, outdoor, mountain, lake, city, country, home, party, sporting event, zoo, concert, etc. The scores indicative of desirability, or desirability scores, may be a number on a scale (e.g., a five point scale, scale from zero to one, etc.). Such scores may be based on technical quality and subjective importance, as perceived from a human labeling the video data. For example, on a five point scale, the combination of strong technical quality (e.g., full exposure, even color distribution, minimal camera motion, bright colors, focused faces, etc.) and subject importance above a predetermined threshold (e.g., main character, clear audio, minimal camera motion and/or object motion, etc.) may result in desirable video data, or a desirability score closer to five. In contrast, poor technical quality (e.g., poor exposure, uneven color distribution, significant camera motion, dark picture, etc.) and/or subjective importance below a predetermined threshold (e.g., unimportant character, muffled audio, significant camera motion and/or object motion, etc.) may result in undesirable video data, or a desirability score closer to zero. In at least some examples, video data may have a neutral level of desirability (e.g., the video data is not desirable or undesirable), or a desirability score near 2. The receiving module 202 may provide the received video data to the extracting module 118 for feature extraction before training the classifier and scoring model in the learning module 204.

In at least one example, the extracting module 118 extracts low level and high level features from the video data. Feature extraction may describe the process of identifying different features of the video data and leveraging those features for additional processing. In at least one example, feature extraction may describe determining a value or set of values for the video data based on the feature extraction. Features may include visual features, textual features, audio features, motion features, spectrum features, etc. Features may be extracted per video frame, video segment, video file, and/or video collection level.

In at least one example video frame level features that may be extracted may include image content based features that may be useful for categorization. Examples of image content based features include color, movement, scale-invariant feature transform (SIFT), generalized search tree (GiST), histogram of oriented gradients (HOG), etc. Video frame level features may include high level and low level features, as described below.

Examples of video segment level features may include the video frame level features as described above and motion and audio related features. In at least one example, the video frame level features may be averaged and/or concatenated over multiple video frames. The motion related features may be extracted from video segments and may include block-wise frame difference, camera motion types and directions, objection motion intensity and directions, etc. Video segment level features may include high level and low level features, as described below. Video file level features and video collection level features may include video segment level features extracted from the entire video file or video collection, respectively. Additionally, video file level features may include audio track features extracted from the video file.

Examples of features are shown in the example pseudo-code below.

```
float centerExposureRating;
    float exposureRating;
    float saturationQuality;
    float hueVariety;
    float frameHistogramDifference;
    float sharpnessHighDeltaLevel;
    float sharpnessMaxDelta;
    float chromaNoise;
    float lumaNoise;
    float noiseDetails;
    float colorEntropy;
... float dominant color
... float normalized frame time
    float averagePixelBrightness;
    float salience;
    float audioShortTimeEnergy;
    float audioZeroCrossingRate;
    float faceImportance;
    float faceCountScore;
    float frameMovement; // distance
    float verticalMove; // distance
    float zoom; // Ratio
    float overallmotionScore;
```

Low level features may be representative of features that may be extracted without using sophisticated rules or models. Low level feature values may represent raw values associated with the features extracted from the video frames. The low level feature values may not be used directly to assess a quality or importance of a video, but may be used as building blocks to make such an assessment. Low level features may include at least exposure quality, saturation quality, hue-variety, and stability.

Exposure quality feature extraction may measure how light reflects from a subject in a video frame. The exposure quality feature extraction may include determining an exposure quality feature value based on a balance of a histogram for a video frame. The histogram may show whether the video frame is underexposed or overexposed and a number of light, dark, and mid-tones in the video frame. For example, a video frame may receive a high exposure quality value (above a predetermined threshold) if the video frame has a well-balanced histogram. A well-balanced histogram may be represented by a histogram that fits within the span of a graph, slopes down to meet a bottom axis of the graph, and is not cut off on the right hand or left hand side of the graph. The exposure quality feature value may be may be represented by numbers between zero and one, where one represents a highest exposure quality feature value.

Saturation quality feature extraction may measure how pure a color appears in a video frame. The saturation quality feature extraction may include considering saturation histograms (e.g., Hue Saturation Value (HSV) color space, etc.) for video frames and determining saturation quality feature values based on the saturation level of the middle values of the histograms. For example, a video frame having more saturation in the middle range of the histogram may receive a higher saturation quality value. The saturation quality feature value may be may be represented by numbers between zero and one, where one represents a highest saturation quality feature value.

Hue variety feature extraction may measure the variety of colors in a video frame. A hue histogram for a video frame may be used for determining hue variety feature values. A balanced histogram may indicate a variety of color in a video frame. If a video frame has a variety of color, the video frame may receive a higher feature value for hue variety. The hue variety feature values may be represented by single numbers between zero and one, where one represents a highest hue variety feature value.

Stability feature extraction may measure how shaky a video frame appears. Stability feature extraction may include identifying and tracking movement of feature points (e.g., interesting points) to identify camera and/or object motion in video frames. Local and global trends related to a magnitude and direction of feature point movement may be used to quantify the stability of the video frame as a stability feature value. Stability feature values may be determined on a per video frame basis and the stability feature value may be between zero and one, where one represents a highest stability feature value.

High level features may be representative of features extracted from video frames, video segments, video files, and/or video collections. High level features may be representative of features that may be extracted using sophisticated rules or models. High level feature values may represent values associated with the features extracted from the video frames, video segments, video files, and/or video collections. High level features may include face detection, face recognition, and face tracking. Additionally, high level features may include saliency analysis, audio power analysis, speech detection, and/or motion analysis.

In face detection feature extraction, video frames may be analyzed using existing code to detect whether faces are present in the video frames. In addition to detecting faces in video frames, other high level features based on properties of the detected faces may also be calculated. Examples of such high level features include positions corresponding to the detected faces, areas associated with the detected faces, face related importance scores, and confidence scores assessing a correctness of the detection, etc. An example of the pseudocode that may be used for such high level feature extraction is provided below.

```
// Calculate per face importance score
    // This is based on:
    // 1. Normalized face area
    // 2. Distance of the face from center
    // 3. Apperance % for that face (face-group)
    for (size_t frameNumber = 0; frameNumber < m_faceFlatIndicesByFrame.size( ); frameNumber++)
    {
        facesCountScore[frameNumber] = 0.0f;
        auto flatIndices = m_faceFlatIndicesByFrame[frameNumber];
        float totalFrameScore = 0;
        for (auto flatIndex : flatIndices)
        {
          totalFrameScore +=
            AdjustFaceAreaBasedOnRules(
                m_groupingInput[flatIndex]->GetNormalizedArea( ))
    +
                (1.0f – m_groupingInput[flatIndex]–
    >GetDistanceFromCenter( ));
            size_t personIndex =
    FindPersonIndexFromFlatIndex(flatIndex);
```

```
        if (personIndex < m_dataByPerson.size( ))
        {
            const auto& person = m_dataByPerson[personIndex];
            totalFrameScore += person.appearanceFrequency;
            facesCountScore[frameNumber] += 1.0f;
        }
    }
    for (const auto& person : m_dataByPerson)
    {
        if (!person.assumedFacesByFrameIndex.empty( ) &&
            person.assumedFacesByFrameIndex[frameNumber])
        {
            facesCountScore[frameNumber] += 1.0f;
            totalFrameScore += person.appearanceFrequency;
        }
    }
    faceImportanceScore[frameNumber] = totalFrameScore;
    facesCountScore[frameNumber] = facesCountScore
[frameNumber] / static_cast<float>(s_maxFaces);
    }
}
```

Face recognition extraction may use existing face recognition code on detected faces to match same faces detected on different frames. In at least one example, if any of the detected faces have been tagged in the past as a particular individual identified by the face and/or with information regarding a relationship or importance of the detected face to a user, such data may be used to boost the confidence score of the corresponding faces. Face tracking feature extraction may use existing code to group same faces detected on individual video frames into groups, and identify the groups as associated with particular individuals. The face tracking feature extraction and face recognition feature extraction may be useful for identifying prominent faces in video data and main characters associated with the video data. Further, face tracking feature extraction and face recognition feature extraction may be useful for identifying a person associated with a detected face and identifying an importance and/or relationship to a user. This information may be leveraged in determining the desirability score. Face tracking feature extraction and face recognition feature extraction may also be useful during post-processing for ranking video data.

Additionally, high level feature extraction may include, among others, saliency analysis, audio power analysis, speech detection, and/or motion analysis. In at least one example, existing code may be used to detect salient parts of a video frame. In the at least one example, a salient part of a video frame may represent an important or prominent part of the video frame. In at least one example, saliency feature extraction may produce a heat map representing an importance for every pixel in the frame. Local rules may be applied to the heat map (e.g., promote value for faces, promote value if center of mass of the salient region is closer to the center of the video frame, etc.) and a saliency feature value representative of an individual frame may be calculated based on the average of the adjusted saliency heat map. Audio power analysis may include analyzing audio data for properties such as short-time energy and zero-crossing-rate. Speech analysis may include analyzing audio data to determine whether the audio data is speech, music, or noise. Motion feature analysis may include identifying and tracking movement of feature points (e.g., interesting points) to identify camera and/or object motion between the video frames. Results from the motion feature extraction may be further processed to compute desirability score for the video file based on some global rules.

In addition to the feature values described above (e.g., saturation quality feature value, hue variety feature value, saliency feature value, etc.) that may be determined for the video data, additional feature values may be determined by calculating derivatives from the feature values described above. In at least one example, the derivatives of the extracted features may take into account temporal relationships between the video frames, video segments, video files, and/or video collections. The derivatives may include an average and/or standard deviation for values associated with a video file, differences between values associated with individual video frames and the calculated average and/or standard deviation, differences between values associated with neighboring video frames, etc. The extracting module 204 may provide the feature values, including the derivative values, to the learning module 204 for training the classifier and the scoring model. An example of feature values and derivative features are provided in the example pseudocode below.

```
void AddDerivatives(_Inout_vector<float>& row, _In_ const
FeatureDerivatives& derivatives)
    {
        row.push_back(derivatives.average);
        row.push_back(derivatives.differenceFromAverage);
        row.push_back(derivatives.differenceFromPrevious);
    }
    std::vector<float> AssembleFeatureRow(_In_ const
AnalysisResultsRow& resultsRow, LONGLONG
sourceVideoDuration)
    {
        vector<float> row;
        // Normalized time.
        row.push_back(static_cast<float>(resultsRow.frameTime) /
sourceVideoDuration);
        // All features and their derivatives.
        row.push_back(resultsRow.centerExposureRating);
        AddDerivatives(row,
resultsRow.centerExposureRatingDerivatives);
        row.push_back(resultsRow.exposureRating);
        AddDerivatives(row, resultsRow.exposureRatingDerivatives);
        row.push_back(resultsRow.saturationQuality);
        AddDerivatives(row, resultsRow.saturationQualityDerivatives);
        row.push_back(resultsRow.hueVariety);
        AddDerivatives(row, resultsRow.hueVarietyDerivatives);
        row.push_back(resultsRow.frameHistogramDifference);
        AddDerivatives(row,
resultsRow.frameHistogramDifferenceDerivatives);
        row.push_back(resultsRow.sharpnessHighDeltaLevel);
        AddDerivatives(row,
resultsRow.sharpnessHighDeltaLevelDerivatives);
        row.push_back(resultsRow.sharpnessMaxDelta);
        AddDerivatives(row,
resultsRow.sharpnessMaxDeltaDerivatives);
        row.push_back(resultsRow.chromaNoise);
        AddDerivatives(row, resultsRow.chromaNoiseDerivatives);
        row.push_back(resultsRow.lumaNoise);
        AddDerivatives(row, resultsRow.lumaNoiseDerivatives);
        row.push_back(resultsRow.noiseDetails);
        AddDerivatives(row, resultsRow.noiseDetailsDerivatives);
        row.push_back(resultsRow.colorEntropy);
        AddDerivatives(row, resultsRow.colorEntropyDerivatives);
        row.push_back(resultsRow.averagePixelBrightness);
        AddDerivatives(row,
resultsRow.averagePixelBrightnessDerivatives);
        row.push_back(resultsRow.salience);
        AddDerivatives(row, resultsRow.salienceDerivatives);
        row.push_back(resultsRow.faceCountScore);
        AddDerivatives(row, resultsRow.faceCountScoreDerivatives);
        row.push_back(resultsRow.faceImportance);
        AddDerivatives(row, resultsRow.faceImportanceDerivatives);
        row.push_back(resultsRow.frameMovement);
        row.push_back(resultsRow.verticalMove);
        row.push_back(resultsRow.zoom);
        row.push_back(resultsRow.motionScore);
        AddDerivatives(row, resultsRow.motionScoreDerivatives);
```

```
        row.push_back(resultsRow.dominantColorCode);
        row.push_back(resultsRow.audioShortTimeEnergy);
        AddDerivatives(row,
    resultsRow.audioShortTimeEnergyDerivatives);
        row.push_back(resultsRow.audioZeroCrossingRate);
        AddDerivatives(row,
    resultsRow.audioZeroCrossingRateDerivatives);
        return row;
    }
```

The learning module 204 may be configured to train a classifier and a scoring model based on the low level, high level, and derivative feature values. The classifier includes a plurality of classifiers that may be used to generate a plurality of high level semantic feature values. The classifier may be used to estimate a probability that a video frame, video segment, video file, and/or video collection belongs to at least one of the categories in the predefined set of semantic categories (e.g., indoor, outdoor, mountain, lake, city, country, home, party, sporting event, zoo, concert, etc.). The classifier may be trained by applying models such as Linear Support Vector Machine (SVM), Fast Tree Binary Classification, Fast Rank Binary Classification, Logistic Regression, Averaged Perception, etc., to the feature values extracted or derived, as described above. The learned classifier may be stored in the classifying module 124.

The scoring model may be used to determine a desirability score for video frames, video segments, video files, and/or video collections. The scoring model may be trained by applying models such as Fast Tree Binary (Boosted Trees) Ranking, Boosted Trees Ranking (FastRank), etc. to the feature values extracted or derived, as described above. The learned scoring model may receive low level features and high level features associated with video frames, video segments, video files, and/or video collections as input and may output a desirability scores to represent the desirability of the video frames, video segments, video files, and/or video collections.

In at least one example, the classifying module 124 may apply the learned classifier to the video frames, video segments, video files, and/or video collection before training the scoring model. As a result, a set of feature values indicating probabilities that a video frame, video segment, video file, and/or video collection belongs to at least one of the categories in the predefined set of semantic categories may be included in the feature values used to train the scoring model. In the at least one example, using the feature values resulting from applying the classifier to the feature values allows the scoring model to account for variations in categories of video data. For example, by using the feature values resulting from applying the classifier, the scoring model may learn that dark video frames and/or segments in video data from a concert may not be undesirable video data even though most of the video data from concerts is dark. Accordingly, the scoring module 126 may output a score reflective of such circumstances.

The extracting module 118 may include the classifying module 124. The classifying module 124 may apply the classifier to the set of feature values. In at least one example, the classifying module 124 outputs a set of values indicating a probability that a video frame, video segment, video file, or video collection belongs to a particular category of the predefined set of categories. The set of values may be used by the scoring module 126 in calculating the desirability score. In at least one example, the classifying module 124 may apply the classifier to video file level features such that the resulting set of features may be the same for the video segments and video frames associated with the video file.

The ranking module 120 may be configured to leverage the learned scoring model for identifying desirable video data in new video data. The ranking module 120 may include at least the scoring module 126 and a segmenting module 206. The ranking module 120 may be configured to receive one or more inputs from one or more users 106. The users 106 may input video data into the ranking module 120 via one of the user devices 108. For example, in at least one example, a user 106 may select video data stored on his or her user device 108 or a remote storage location (e.g. server, cloud, etc.) for input into the ranking module 120. In another example, a user 106 may record new videos via his or her user device 108 and input at least some of the videos into the ranking module 120. In at least one example, the ranking module 120 may decode the video data.

The scoring module 126 receives the feature values, including the set of values resulting from feature extraction and the set of feature values resulting from the classifying module 124. The scoring module 126 applies the scoring model to the feature values. In at least one example, the set of values resulting from the classifying module 124 may be used by the scoring module 126 to determine the desirability score for a video frame and/or video segment. The desirability score for individual video frames and/or video segments may be coalesced and organized into a curve representing desirability scores for all video frames and/or video segments of a video file. The scoring module 126 may process the curve to identify general areas of high desirability scores in the video file, or general areas having desirability scores above a predetermined threshold. In at least some examples, the curve may be output to the segmenting module 206 to locate precise boundaries for video segments in the video file.

In at least one example, the scoring module 126 may determine a desirability score for a video segment, video file, and/or a video collection by adding together the desirability scores associated with the video frames in the video segment, video file, and/or video collection, and finding an average desirability score based on the number of video frames in the video segment, video file, and/or video collection.

The post-processing module 122 may be configured to receive scored video data and process the scored video data for presentation to the user 106. In some examples, the presentation to the user 106 is in response to a query from the user 106. In at least one example, the post-processing module 122 may be configured to analyze other data relevant to the video data with corresponding desirability scores, such as user interaction with the video data, etc. For example, the post-processing module 120 may process the video data based on how many times a user has played back or shared the video data. In other examples, the post-processing module 122 may process the video data based on receiving user input indicating the user likes or dislikes the content. In some examples, the post-processing module 122 may process the video data by tagging the video data with information regarding characters in the video data and/or relationships of the characters identified in the video data (e.g., daughter, wife, etc.). Additional examples include diversifying video data to ensure that a variety of video data is presented to a user, even though some of the video data did not receive desirability scores as high as other video data. The various post-processing processes may be combined and leveraged to determine scores for particular user specified scenarios.

Example Processes for Training Classification and Scoring Models

Figure 3:
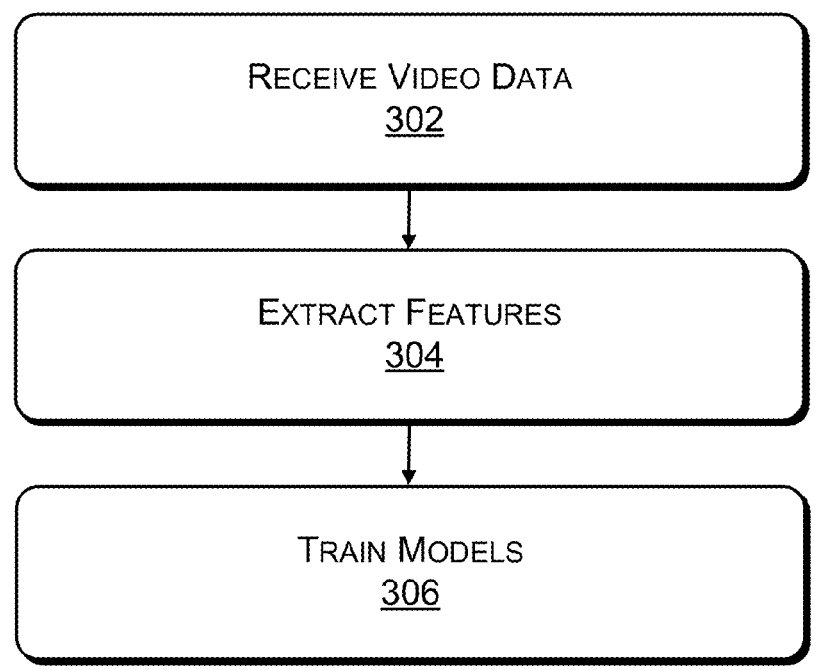
FIG. 3 is a flow diagram that illustrates a process for training models from video data based on extracting low level and high level features.
Figure 4:
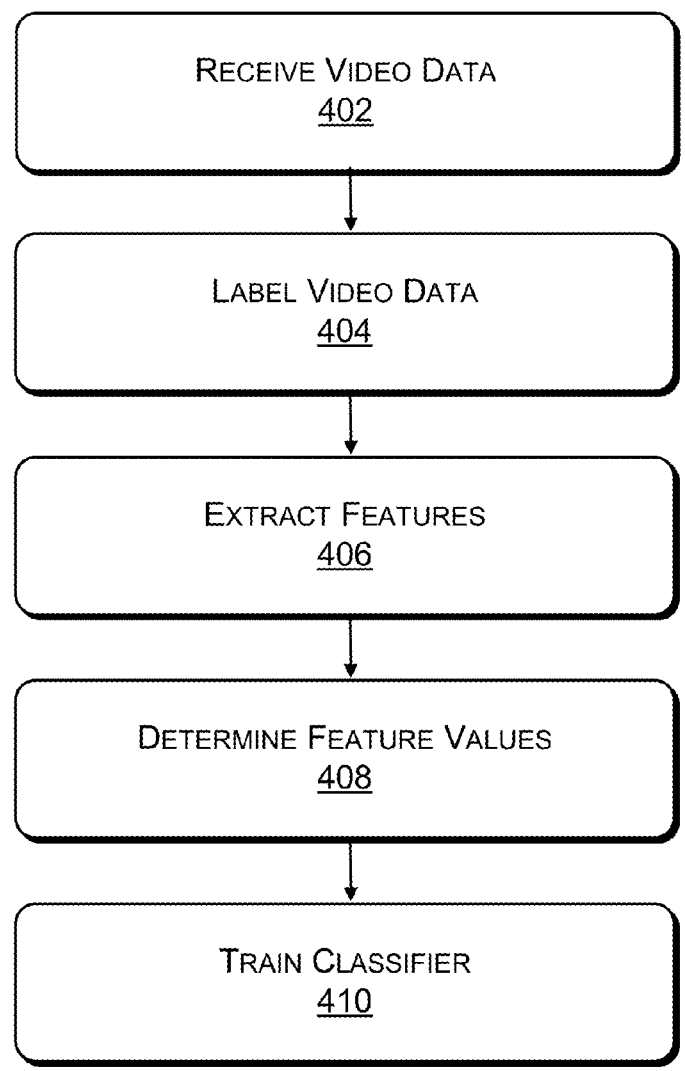
FIG. 4 is a flow diagram that illustrates a process for training a classifier from video data based on feature values.
Figure 5:
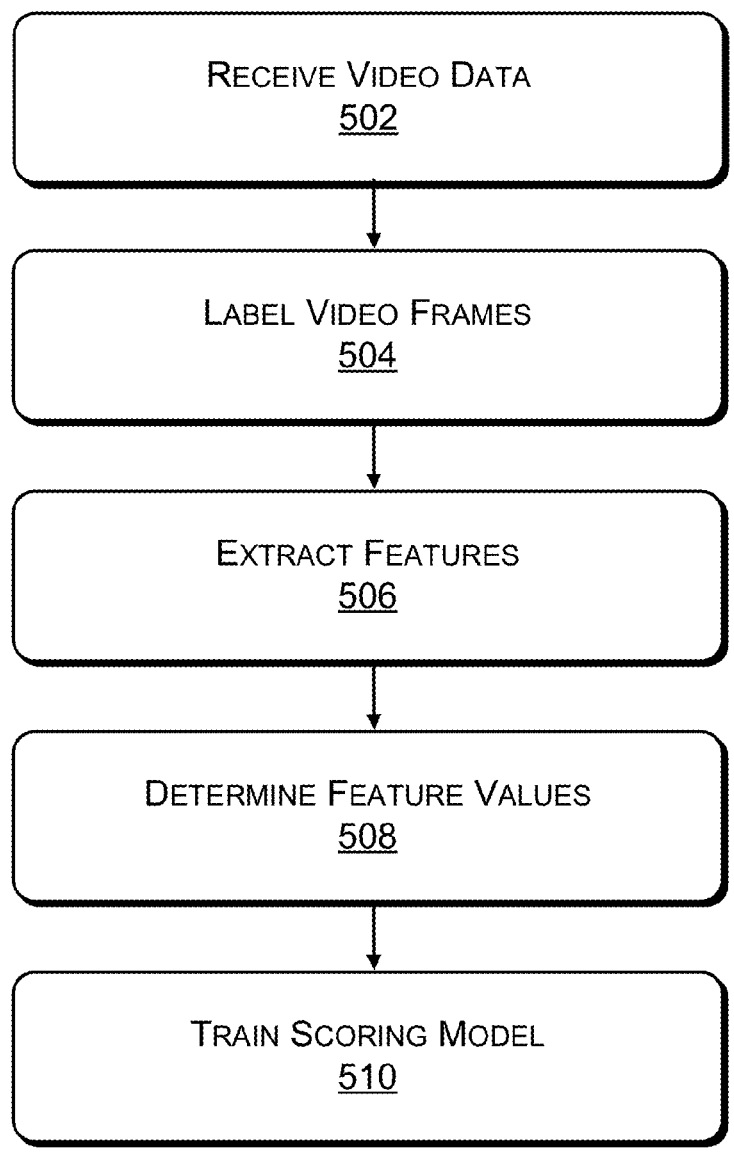
FIG. 5 is a flow diagram that illustrates a process for training a ranking model from video data based on feature values.

FIGS. 3-5 each illustrate processes for training models from video data based on low level and high level features. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 illustrates a general process 300 for training the models. The process 300 is described with reference to the environments 100 and 200. The process 300 may be performed in other similar and/or different devices, architectures, and/or environments.

At 302, the receiving module 202 receives a corpus of video data. The video data may include video collections, video files, video segments, and/or video frames. As described above, in some examples, the video data may be labeled to indicate a category (e.g., indoor, outdoor, mountain, lake, city, country, home, party, sporting event, zoo, concert, etc.) and/or a score indicative of desirability.

At 304, the extracting module 118 extracts low level and high level features from the video data for training models. As described above, feature extraction may describe the process of identifying different values of video data and leveraging those features for additional processing. In at least one example, feature extraction may describe determining a value or set of values for video data based on the feature extraction. Features may include visual features, textual features, audio features, motion features, spectrum features, etc. Features may be extracted per video frame, video segment, video file, and/or video collection level.

At 306, the learning module 204 trains the models. The learning module 204 may be configured to train a classifier and a scoring model. The classifier may be used to estimate a probability that a video frame, video segment, video file, and/or video collection belongs to at least one of the categories in the predefined set of semantic categories (e.g., indoor, outdoor, mountain, lake, city, country, home, party, sporting event, zoo, concert, etc.). The classifier may be trained by applying models to the feature values extracted or derived, as described above. The scoring model may be used to determine a desirability score for video frames, video segments, video files, and/or video collections. The scoring model may be trained by apply models to the feature values extracted or derived, as described above.

FIG. 4 illustrates a process 400 for training a classifier from video data based on low level and high level features. The classifier may be used to estimate a probability that a video frame, video segment, video file, and/or video collection belongs to at least one of the categories in the predefined set of semantic categories (e.g., indoor, outdoor, mountain, lake, city, country, home, party, sporting event, zoo, concert, etc.). The process 400 is described with reference to the environments 100 and 200. The process 400 may be performed in other similar and/or different devices, architectures, and/or environments.

At 402, the receiving module 202 receives video data. The video data may include video collections, video files, video segments, and/or video frames.

At 404, the video data may be labeled to indicate a category. As described above, in some examples, the video data may be labeled to indicate a category (e.g., indoor, outdoor, mountain, lake, city, country, home, party, sporting event, zoo, concert, etc.) associated with the video data.

At 406, the extracting module 118 extracts low level and high level features from the video data for training models, as described above. Feature extraction may describe the process of identifying different attributes of video data and leveraging those features for additional processing. Features may be extracted per video frame, video segment, video file, and/or video collection level. The features may include exposure quality, saturation quality, hue variety, stability, face detection, face recognition, face tracking, saliency analysis, audio power analysis, speech detection, motion analysis, etc.

At 408, the extraction module 204 determines feature values. In at least one example, feature extraction may describe determining a value or set of values for video data based on the feature extraction. Examples of feature values include saturation quality feature values, hue variety feature values, saliency feature values, etc. Additional feature values may be determined based on deriving statistics from the extracted feature values.

At 410, the learning module 204 trains the classifier. The classifier may be used to estimate a probability that a video frame, video segment, video file, and/or video collection belongs to at least one of the categories in the predefined set of semantic categories (e.g., indoor, outdoor, mountain, lake, city, country, home, party, sporting event, zoo, concert, etc.). The classifier may be trained by applying models (e.g., support vector machine (SVM), etc.) to the feature values extracted or derived, as described above.

FIG. 5 illustrates a process 500 for training a scoring model from video data based on low level and high level features. The process 500 is described with reference to environments 100 and 200. The process 500 may be performed in other similar and/or different devices, architectures, and/or environments.

At 502, the receiving module 202 receives a corpus of video data. The video data may include video collections, video files, video segments, and/or video frames.

At 504, the video data may be labeled to indicate a level of desirability. As described above, in some examples, the video data may be labeled to indicate a level of desirability via a desirability score.

At 506, the extracting module 118 extracts low level and high level features from the video data for training models, as described above. Feature extraction may describe the process of identifying different attributes of video data and leveraging those features for additional processing. Features may be extracted per video frame, video segment, video file, and/or video collection level. The features may include exposure quality, saturation quality, hue variety, stability, face detection, face recognition, face tracking, saliency analysis, audio power analysis, speech detection, motion analysis, etc.

At 508, the extracting module 118 determines feature values. In at least one example, feature extraction may describe determining a value or set of values for video data based on the feature extraction. Examples of feature values include saturation quality feature values, hue variety feature values, saliency feature value, etc. In at least one example, the learned classifier may be applied to the video frames, video segments, video files, and/or video collection to determine a set of feature values indicating probabilities that a video frame, video segment, video file, and/or video collection belongs to at least one of the categories in the predefined set of semantic categories. The set of feature values resulting from application of the classifier may be included in the feature values used to train the scoring model. In the at least one example, using the feature values resulting from applying the classifier to the other feature values allows the scoring model to account for variations in video data resulting from variations in categories of video data.

At 510, the learning module 204 trains the scoring model. The scoring model may be used to determine a desirability score for video frames, video segments, video files, and/or video collections. The scoring model may be trained by applying models (e.g., FastRank, etc.) to the feature values extracted or derived, as described above.

Example Environment for Identifying Desirable Video Data

Figure 6:
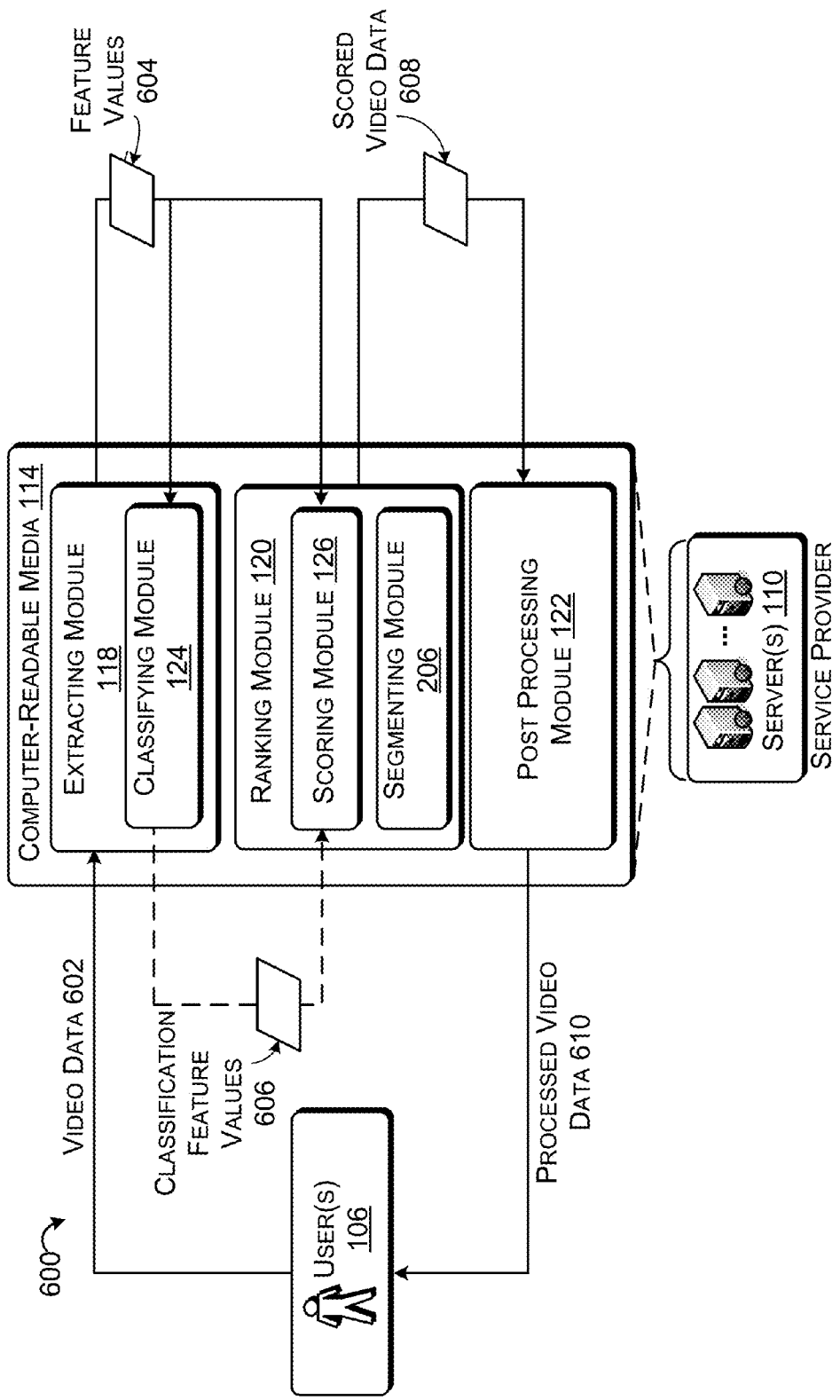
FIG. 6 is a flow diagram that illustrates a diagram showing an example environment for identifying desirable video data in new video data.

FIG. 6 illustrates a diagram showing an example environment 600 for identifying desirable video data in new video data. Users 106 may input video data 602 into the extracting module 118 via one of the user devices 108. For example, in at least one example, a user 106 may select video data 602 stored on his or her user device 108 for input into the extracting module 118. In another example, a user 106 may take videos via his or her user device 108 and input at least some of the videos as video data 602 into the extracting module 118. In at least one example, the video data 602 is decoded video data. In some examples, additional information may be input from other databases for use in the post-processing module (e.g., how many times a video file has been shared, viewed, like, etc., or important people to the user 106).

The extracting module 118 may process the input video data to extract low level and high level features. The extracting module 118 extracts low level and high level features and determines feature values 604 as described above. The feature values 604 may be determined from feature extraction and/or derivatives of the feature values that resulted from the feature extraction, as described above. Feature extraction may be performed on a video frame level, video segment level, video file level, and/or video collection level. The extracting module 118 outputs a set of feature values 604 for the classifying module 124 and scoring module 126 to process.

The classifying module 124 applies the classifier to the extracted feature values, as described above. In at least one example, the classifying module 124 outputs a set of values, classification feature values 606, indicating a probability that a video frame, video segment, video file, and/or video collection belongs to a particular category of a predefined set of categories. The set of classification feature values 606 may be used by the scoring module 126 in calculating the desirability score.

The scoring module 126 receives the extracted feature values 604, including the set of classification feature values 606 that are output from the classifying module 124. The scoring module 126 applies the scoring model to the feature values 604 and classification feature values 606. In at least one example, based on the application of the scoring model to the extracted feature values 604 and classification feature values 606, the scoring module 126 may determine the desirability score for a video frame and/or video segment (e.g., scored video data 608). The desirability score for individual video frames and/or video segments may be coalesced and organized into a curve representing a video file. The scoring module 126 may process the curve to identify general areas of desirability scores above a predetermined threshold in the video file. In at least some examples, the curve may be output as scored video data 608 to the segmenting module 206 to locate precise boundaries for the general areas having desirability scores above a predetermined threshold in the video file.

The scoring module 126 may also determine desirability scores for video segments, video files, and/or video frames by adding the desirability scores for individual video frames that make up the video segments, video files, and/or video collection and finding an average for the video segment, video file, and/or video collection.

The segmenting module 206 may locate precise boundaries in the video files. In some examples, the segmenting module 206 may locate precise boundaries for the general areas having desirability scores above a predetermined threshold in video files.

In at least one example, the segmenting module 206 may consider camera motion boundaries to precisely identify boundaries associated with the general areas having desirability scores above a predetermined threshold in the video files. Camera motion boundaries may consider the movement of a camera in a static scene. In the at least one example, video frames identified as highly desirable based on a desirability score above a predetermined threshold, may be analyzed for camera motions such as panning in one direction (e.g., pan left, pan right, panning to a top of a scene, panning to a bottom of a screen, etc.) and/or zooming (e.g., zoom in, zoom out). A boundary may be defined when the camera motion changes.

For example, a video file may include several video segments of a cat looking out a window. The cat may be fairly static but the camera may be panning left to identify the cat in the window and center the cat on the screen. The camera user may want to show that the cat is looking at a bird outside the window and accordingly, after panning to locate the cat in the middle of the screen, may zoom in towards the cat. Then, the camera user may zoom out to focus on the cat in the window again. Each of the motions described above (e.g., panning left, zooming in, zooming out) may be used to identify different video segments of the video file based on the camera movement.

The segmenting module 206 may also locate the boundaries by detecting changes in the trends of different features. For example, the brightness and/or sharpness of video frames or video segments may suddenly change. Based on those changes, the segmenting module 206 may identify boundaries in the video files.

The segmenting module 206 may determine camera motion boundaries of an object between video frames of a video file. In at least one example, the segmenting module 206 determines the object motion intensities extracted by the extracting module 118. Then, the segmenting module 206 identifies changes in motion intensities between video frames where the changes are above a predetermined threshold. For instance, the segmenting module 206 may identify a boundary when a first video frame includes nearly no object motion intensity (object motion intensity below a predetermined threshold) and a neighboring video frame includes high object motion intensity (object motion intensity above a predetermined threshold). Additionally, the segmenting module 206 may identify a boundary when a first video includes high object motion intensity (object motion intensity above a predetermined threshold) and a neighboring video frame includes nearly no object motion intensity (object motion intensity below a predetermined threshold).

For example, if a camera is capturing a cat playing with a yarn ball, the cat may be holding the yarn ball and consequently there may be nearly no object motion intensity (object motion intensity below a predetermined threshold) in the video frames associated with such action. The techniques described above may identify that video frames associated with the cat throwing the yarn ball in the air are highly desirable, as would be indicated by desirability scores associated with each of the video frames above a predetermined threshold. However, the set of video frames (e.g., video segment) associated with the cat throwing the yarn ball in the air may each display high object motion intensity (object motion intensity above a predetermined threshold). In the video frame following the last video frame associated with the cat throwing the yarn ball, the cat may be holding the ball of yarn again and thus, the video frame may have nearly no object motion intensity (object motion intensity below a predetermined threshold). Accordingly, the segmenting module 206 may identify three separate video segments, wherein the boundaries may be precisely defined by changes in the object motion intensities reflective of the cat throwing the ball of yarn in the air.

In some examples, the segmenting module 206 can detect changes in trends of camera and/or object motion. For instance, if a user is panning a camera for several seconds and suddenly begins to zoom in or out, the segmenting module 206 may identify a segment boundary where the user started zooming in or out.

The scored video data 608 may be received by the post-processing module 122. The post-processing module 122 may process the scored video data 608 as described above and may return processed video data 610 to the user 106. The processed video data 610 may include video data having a desirability score and/or additional scores for comparing video data. For example the additional scores could include technical quality scores, subjective quality scores, people scores (e.g., score associated with importance of person), etc.

The processed video data 610 may be used for identifying a set of video data and ranking individual video frames, video segments, video files, or video collections in the video data based on which individual video frames, video segments, video files, or video collections are the most desirable according to desirability scores. In other examples, the identified set of video data may be filtered based on levels of desirability per the desirability scores associated with individual video frames, video segments, video files, and/or video collections. For instance, video frames, video segments, video files, and/or video collections may be ranked against other video frames, video segments, video files, and/or video collections based on the desirability scores. The processed video data 610 may also be leveraged in other manners as described above.

Example Processes for Identifying Desirable Video Data

The processes described in FIGS. 7 and 8 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
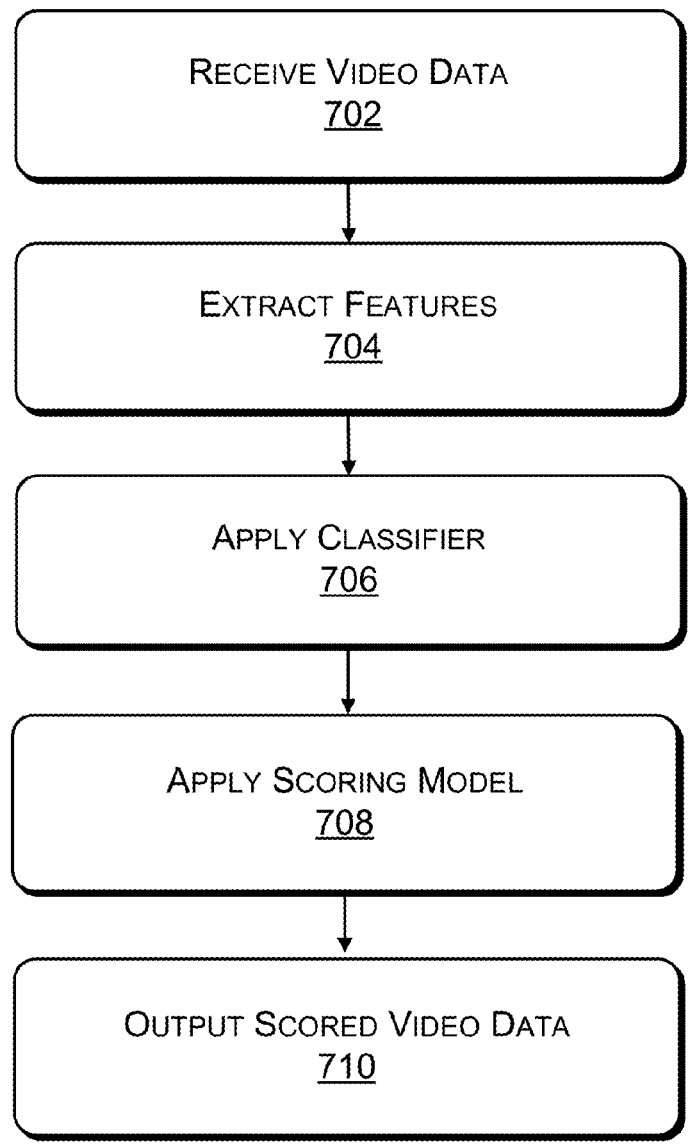
FIG. 7 is a flow diagram that illustrates a process for identifying desirable video data in new video data.

FIG. 7 illustrates a process 700 for identifying desirable video data in a new video data. The process 700 is described with reference to environments 100 and 200. The process 700 may be performed in other similar and/or different devices, architectures, and/or environments.

At 702, the ranking module 120 receives video input. For example, in at least one example, a user 106 may select video data 602 stored on his or her user device 108 for input into the ranking module 120. In another example, a user 106 may take videos via his or her user device 108 and input at least some of the videos as video data 602 into the ranking module 120. In at least some examples, the video data 602 may be decoded video data.

At 704, the extracting module 118 extracts features from the received video data 602. The extracting module 118 may process the video data 602 to extract low level and high level features. The extracting module 118 extracts low level and high level features and determines feature values 604, as described above. The feature values 604 may be determined from feature extraction and/or derivatives of the feature values that resulted from the feature extraction, as described above. Feature extraction may be performed on a video frame, video segment, video file, and/or video collection level. In at least some examples, the level of feature extraction depends on the level of ranking desired by the user. For example, if the user wants to rank video files in a video collection, feature extraction may be performed at the video file level. In such examples, frame level and segment level feature extraction may also occur. The extracting module 118 outputs a set of feature values 604 for the ranking module 120 to process.

At 706, the classifying module 124 applies the classifier. The classifying module 124 applies the classifier to the feature values 604, as described above. In at least one example, the classifying module 124 outputs a set of feature values, classification feature values 606, indicating a probability that a video frame, video segment, video file, or video collection belongs to a particular category of the predefined set of categories. The set of classification feature values 606 may be used by the scoring module 126 in calculating the desirability score for the video frame, video segment, video file, and/or video collection.

At 708, the scoring module 126 applies the scoring model to the feature values 604 and classification feature values 606. In at least one example, based on the application of the scoring model to the extracted feature values 604 and classification feature values 606, the scoring module 126 may determine the desirability score for a video frame and/or video segment (e.g., scored video data 608).

At 710, the ranking module 120 outputs scored video data 604. As described above, the scored video data 608 may be input into the post-processing module 122 for processing the scored video data 608 and outputting a processed video data 610 to the user 106.

Figure 8:
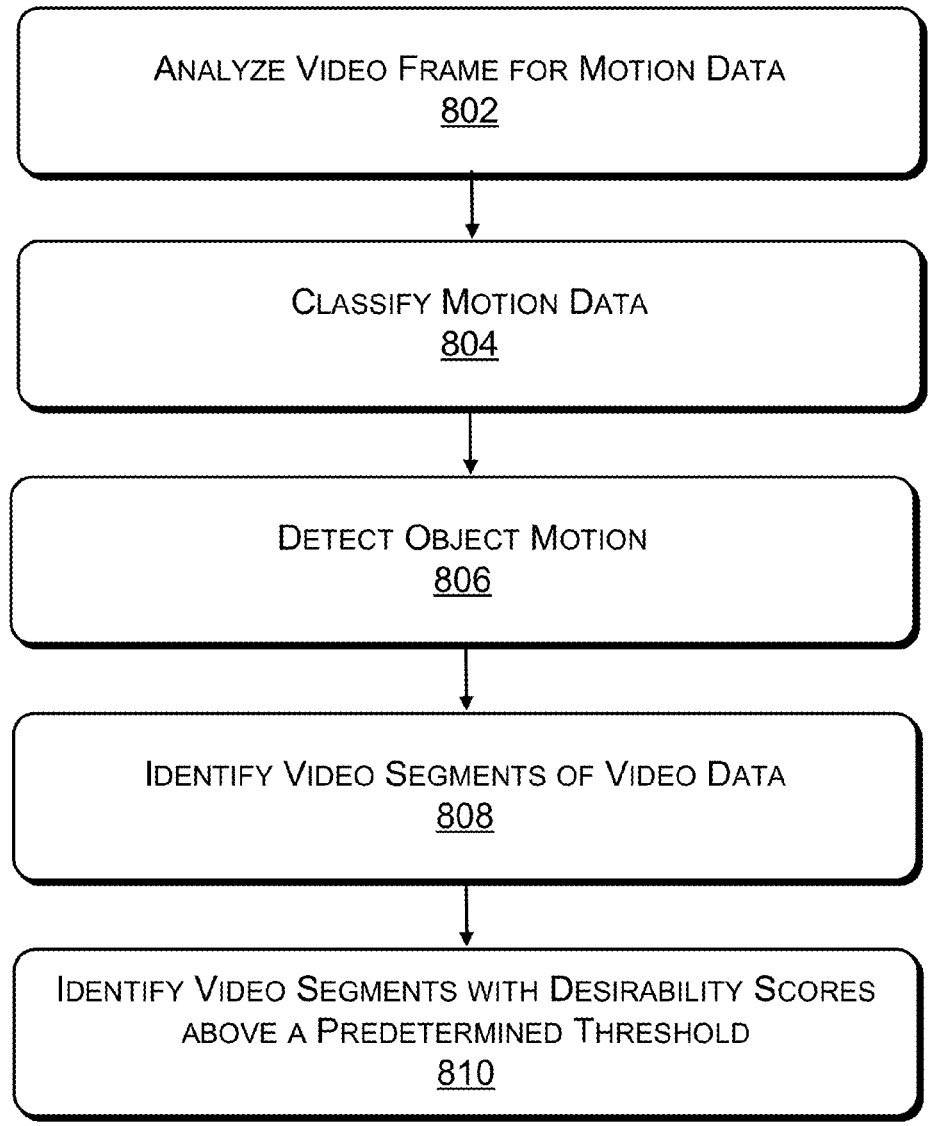
FIG. 8 is a flow diagram that illustrates a process for segmenting a video file based on identified desirable video data.

FIG. 8 illustrates a process 800 for segmenting a video file based on identified desirable video data. The process 800 is described with reference to environments 100 and 200. The process 800 may be performed in other similar and/or different devices, architectures, and/or environments.

At 802, the segmenting module 206 analyzes individual video frames of the video data 602 for motion data. Motion data may include camera motion and/or object motion, as described above.

At 804, the segmenting module 206 classifies the motion data. In the at least one example, individual video frames may be analyzed for camera motions such as panning in one direction (e.g., pan left, pan right, etc.) and/or zooming (e.g., zoom in, zoom out).

At 806, the segmenting module 206 detects object motion in the individual frames. Camera motion boundaries may also consider the movement of an object between video frames of a video file. In at least one example, the segmenting module 206 determines the object motion intensities extracted by the extracting module 118.

At 808, the segmenting module 206 identifies video segments of video data 602. Based on the classified motion data and/or the object motion intensities, the segmenting module 206 may identify boundaries of segments having a desirability score above a predetermined threshold. In at least one example, a boundary may be defined when the camera motion changes between video frames. In other examples, a boundary may be identified when there is a change in motion intensities between video frames above a predetermined threshold.

At 810, the segmenting module 206 identifies video segments with desirability scores above a predetermined threshold. In at least one example, video segments with the desirability scores above a predetermined threshold represent video segments including groups of video frames having the highest desirability scores after the classifier and scoring model are applied to the video frames. Based on the motion data and identified boundaries, the segmenting module 206 may identify precise boundaries of video segments having desirability scores above a predetermined threshold.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "may," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Example Clauses

A. A method comprising, receiving, by one or more computing devices, video data, extracting, by at least one of the one or more computing devices, a plurality of features from the video data, determining, by at least one of the one or more computing devices, a first set of feature values associated with the plurality of features, the first set of feature values for training a classifier and a scoring model, and determining, by at least one of the one or more computing devices, a second set of feature values based on the applying the classifier to the video data. In the at least one example, the method further includes training, by at least one of the one or more computing devices, the scoring model based on the first set of feature values and the second set of feature values, wherein the scoring model determines a desirability score associated with the video data.

B. The method as paragraph A recites, wherein the plurality of features includes low level features and high level features.

C. The method as paragraph B recites, wherein the first set of feature values that are associated with the plurality of features and are leveraged for training a classifier and a scoring model include one or more low level feature values associated with the low level features, one or more high level feature values associated with the high level features, and a plurality of derivative feature values, wherein individual derivative feature values of the plurality of derivative feature values are derived from at least some of the one or more low level feature values or one or more high level feature values.

D. The method as any one of paragraphs A, B, or C recite, wherein the second set of feature values represents probabilities that the video data belongs to at least one semantic category of a predefined set of semantic categories.

E. The method as any one of paragraphs A, B, C, or D recite, wherein the video data described herein comprises a video collection, a video file, a video segment, or a video frame. The video data may also comprise audio data.

F. The method as any one of paragraphs A, B, C, D, or E recite, wherein the first set of feature values represents at least one of video collection level feature values, video file level feature values, video segment level feature values, or video frame level feature values, and the second set of feature values represents video file level feature values.

G. A system comprising memory, one or more processors, and one or more modules stored in the memory and executable by the one or more processors. The one or more modules include an extracting module configured for extracting features from video data and determining a first set of feature values based on the extracted features, and a ranking module configured for determining a desirability score for the video data. The ranking module includes a classifying module configured for applying a classifier to the first set of feature values to determine a second set of feature values, and a scoring module configured for applying a scoring model to the first set of feature values and the second set of feature values to determine a desirability score for the video data.

H. The system as paragraph G recites, wherein the features include at least one of exposure quality, saturation quality, hue variety, stability, face detection, face recognition, face tracking, saliency analysis, audio power analysis, speech detection, and motion analysis.

I. The system as either paragraph G or H recites, wherein the first set of feature values described above represents one or more feature values associated with the features and a plurality of derivative feature values, wherein individual derivative feature values of the plurality of derivative feature values are derived from the one or more feature values.

J. The system as any of paragraphs G, H, or I recite, wherein the second set of feature values represents probabilities that the video data belongs to at least one semantic category of a predefined set of semantic categories.

K. The system as any of paragraphs G, H, I, or J recite, wherein the system described herein further includes a segmenting module configured for identifying video segments in the video data based at least in part on the video segments having desirability scores above a predetermined threshold and detecting boundaries in the video data associated with the video segments.

L. The system as paragraph K recites, wherein the system further includes a post-processing module configured for ranking the video data based at least in part on the desirability scores for the video data or creating a highlight video based at least in part on the detecting the boundaries in the video data and adding transitions between the video segments having the desirability scores above the predetermined threshold.

M. One or more computer-readable storage media encoded with instructions that, when executed by a processor, perform acts comprising, receiving video data including a plurality of video frames, extracting a plurality of features from individual video frames of the plurality of video frames to determine a first set of feature values associated with the individual video frames, applying a classifier to the first set of feature values to determine a second set of feature values associated with the individual video frames, wherein the second set of feature values represents probabilities that the individual video frames belong to at least one semantic category of a predefined set of semantic categories, and applying a scoring model to the first set of feature values and the second set of feature values to determine a desirability score associated with the individual video frames.

N. The computer-readable storage media as paragraph M recites, wherein the first set of feature values represents feature values associated with low level features, high level features, and derivatives of the low level features and the high level features.

O. The computer-readable storage media as either paragraphs M or N recite, wherein the video data comprises video files and the acts further comprise determining a desirability score for individual video files based on an average desirability score associated with individual video frames associated with the individual video file.

P. The computer-readable storage media as paragraph O recites, wherein the acts further comprise ranking the individual video files based at least in part on the desirability scores for the video files.

Q. The computer-readable storage media as any of paragraphs M, N, or O recite, wherein the acts further comprise identifying video segments having desirability scores above a predetermined threshold, wherein the video segments include two or more of the individual video frames having desirability scores above the predetermined threshold; and detecting boundaries in the video data associated with the video segments.

R. The computer-readable storage media as paragraph Q recites, wherein the detecting boundaries associated with the video segments comprises analyzing the individual video frames for motion data and detecting a camera motion in the motion data including pan to left, pan to right, pan to top, pan to bottom, zoom in, or zoom out. Then, based on the camera motion, on the at least one example, the detecting the boundaries further comprise identifying the boundaries associated with the video segments based at least in part on a change in camera motion between a first individual video frame of the individual video frames and a second individual video frame of the individual video frames.

S. The computer-readable storage media as paragraph Q recites, wherein the detecting boundaries associated with the video segments also comprises analyzing the individual video frames for motion data, determining object motion intensities for the individual video frames based on the motion data, and detecting the boundaries when an object motion intensity of a first video frame of the individual video frames and an object motion intensity of a second video frame of the individual video frames differ by a predetermined threshold.

T. The computer-readable storage media as paragraph Q recites, wherein the acts further comprise creating a new video file including the video segments having desirability scores above a predetermined threshold by manipulating the video data based on the detecting of the boundaries in the video data and adding transitions between the video segments having desirability scores above the predetermined threshold.

What is claimed is:

1. A method comprising:
   receiving, by one or more computing devices, video data;
   extracting, by at least one of the one or more computing devices, a plurality of features from the video data;
   determining, by at least one of the one or more computing devices, a first set of feature values associated with the plurality of features, the first set of feature values for training a classifier and a scoring model;
   determining, by at least one of the one or more computing devices, a second set of feature values based on applying the classifier to the video data;
   training, by at least one of the one or more computing devices, the scoring model based on the first set of feature values and the second set of feature values;
   using the scoring model to determine a plurality of desirability scores associated with the video data, wherein an individual desirability score indicative of video quality is associated with an individual video frame in the video data;
   identifying video frames in the video data that have a desirability score above a predetermined threshold desirability score;
   analyzing the video data to determine, in association with the video frames, changes in camera motion and changes in object motion; and
   locating, based at least in part on the changes in camera motion and the changes in object motion, boundaries in the video data to produce one or more video segments, wherein:
     an individual video segment includes at least one video frame that has the desirability score above the predetermined threshold desirability score, and
     the locating the boundaries in the video data comprises determining that object motion intensity of a first video frame and object motion intensity of a second video frame differ by a predetermined threshold.

2. The method of claim 1, wherein:
   the plurality of features includes low level features and high level features;
   the first set of feature values includes at least a low level feature value and a first high level feature value; and
   the second set of feature values includes at least one second high level feature value that is not included in the first set of feature values.

3. The method of claim 2, wherein the first set of feature values represents a plurality of derivative feature values, wherein individual derivative feature values of the plurality of derivative feature values are derived from at least some low level feature values or high level feature values.

4. The method of claim 1, wherein the second set of feature values represents probabilities that the video data belongs to at least one semantic category of a predefined set of semantic categories.

5. The method of claim 1, wherein the video data comprises a video collection.

6. The method of claim 1, wherein the first set of feature values represents at least one of video collection level feature values, video file level feature values, video segment level feature values, or video frame level feature values and the second set of feature values represents video file level feature values.

7. A system comprising:
memory;
one or more processors; and
one or more modules stored in the memory and executable by the one or more processors, the one or more modules including:
an extracting module configured to extract features from video data and determine a first set of feature values based on the extracted features;
a classifying module configured to apply a classifier to the first set of feature values to determine a second set of feature values and to use the second set of feature values to determine a probability that the video data belongs to at least one semantic category of a predefined set of semantic categories;
a scoring module configured to apply a scoring model, based at least in part on the at least one semantic category, to the first set of feature values and the second set of feature values to determine a plurality of desirability scores for the video data, wherein an individual desirability score indicative of video quality is associated with an individual video frame in the video data; and
a segmenting module configured to:
identify video frames in the video data that have a desirability score above a predetermined threshold desirability score;
analyze the video data to determine, in association with the video frames, changes in camera motion and changes in object motion; and
locate, based at least in part on the changes in camera motion and the changes in object motion, boundaries in the video data to produce one or more video segments, wherein:
an individual video segment includes at least one video frame that has the desirability score above the predetermined threshold desirability score, and
the locating the boundaries in the video data comprises determining that object motion intensity of a first video frame and object motion intensity of a second video frame differ by a predetermined threshold.

8. The system of claim 7, wherein the features include at least one of:
exposure quality;
saturation quality;
hue variety;
stability;
face detection;
face recognition;
face tracking;
saliency analysis;
audio power analysis;
speech detection; or
motion analysis.

9. The system of claim 7, wherein the one or more modules further include a post-processing module configured to:
rank the one or more video segments based at least in part on desirability scores of video frames included in an individual video segment; and
create a highlight video based at least in part on the ranking.

10. One or more computer-readable storage media encoded with instructions that, when executed by a processor, perform acts comprising:
receiving video data including a plurality of video frames;
extracting a plurality of features from individual video frames of the plurality of video frames to determine a first set of feature values associated with the individual video frames;
applying a classifier to the first set of feature values to determine a second set of feature values associated with the individual video frames;
using the second set of feature values to determine individual probabilities that the individual video frames belong to at least one semantic category of a predefined set of semantic categories;
applying a scoring model to the first set of feature values and the second set of feature values to determine desirability scores associated with the individual video frames;
identifying a subset of the plurality of video frames in the video data that have a desirability score above a predetermined threshold desirability score;
analyzing the video data to determine, in association with the subset of video frames, changes in camera motion and changes in object motion; and
locating, based at least in part on the changes in camera motion and the changes in object motion, boundaries in the video data to produce one or more video segments, wherein:
an individual video segment includes at least one video frame that has the desirability score above the predetermined threshold desirability score, and
the locating the boundaries in the video data comprises determining that object motion intensity of a first video frame and object motion intensity of a second video frame differ by a predetermined threshold.

11. The computer-readable storage media of claim 10, wherein the first set of feature values represents feature values associated with low level features, high level features, and derivatives of the low level features and high level features.

12. The computer-readable storage media of claim 10, wherein the video data comprises video files and the acts further comprise determining a desirability score for individual video files based on an average desirability score associated with individual video frames associated with the individual video file.

13. The computer-readable storage media of claim 12, wherein the acts further comprise ranking the individual video files based at least in part on the desirability scores for the video files.

14. The computer-readable storage media of claim 10, wherein the camera motion comprises at least one of:
pan to left;
pan to right;

pan to top;
pan to bottom;
zoom in; or
zoom out.

15. The computer-readable storage media of claim 10, wherein the acts further comprise creating a new video file including the video segments having desirability scores above a predetermined threshold by manipulating the video data based on the detecting of the boundaries in the video data and adding transitions between the video segments having desirability scores above the predetermined threshold.

16. The system of claim 7, wherein:
- the features include low level features and high level features;
- the first set of feature values includes at least a low level feature value and a first high level feature value; and
- the second set of feature values includes at least one second high level feature value that is not included in the first set of feature values.

17. The computer-readable storage media of claim 10, wherein:
- the plural of features includes low level features and high level features;
- the first set of feature values includes at least a low level feature value and a first high level feature value; and
- the second set of feature values includes at least one second high level feature value that is not included in the first set of feature values.

* * * * *